Apr. 24, 1923.

J. D. KING

AUTOMOBILE LOCK

Filed Jan. 26, 1920

1,452,879

*Inventor:*
James D. King
By: Oliver O. Martin
His Attorney

Patented Apr. 24, 1923.

1,452,879

UNITED STATES PATENT OFFICE.

JAMES D. KING, OF CHICAGO, ILLINOIS.

AUTOMOBILE LOCK.

Application filed January 26, 1920. Serial No. 354,090.

*To all whom it may concern:*

Be it known that I, JAMES D. KING, a citizen of the United States, residing at Chicago, county of Cook, and State of Illinois, have invented new and useful Improvements in Automobile Locks, of which the following is a specification.

This invention has general relation to a self-propelled vehicle, and it is particularly directed to improvements in devices for disconnecting the steering wheel from the steering mechanism of such vehicle for the purpose of preventing unauthorized operation of the vehicle.

In a former Patent No. 1,271,173, granted to me on July 2, 1918, is shown a structure having a bolt of the steering wheel for engagement with a fixed collar of the steering post, for the purpose of operatively connecting or disconnecting the said wheel and post, and a lock controlling the movement of the said bolt.

The object of the present invention is the provision of mechanism whereby the key of the said lock cannot be removed while the wheel and post are interlocked. I have found that people using the structure of the patent above referred to will forget to turn the key to disengage the wheel from the post, and still insist that they have done so before removing the key. For this reason the aforenamed feature is important. A further object is an improved bolt structure. Another object is to provide a structure readily removable from the steering post when the parts are in position for simultaneous rotation, that is, the wheel locked in engagement with the post.

Figure 1:
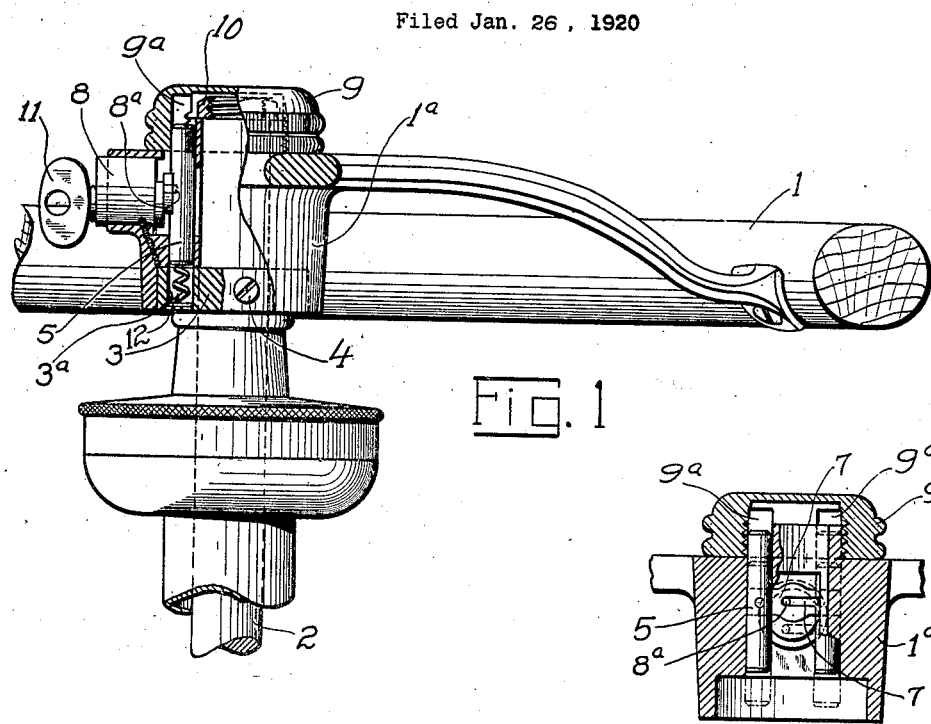
Figure 2:
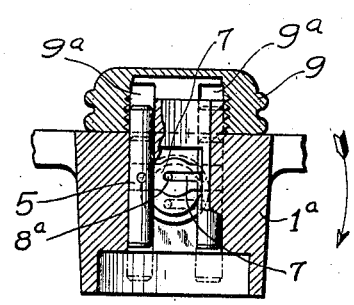
Figure 3:
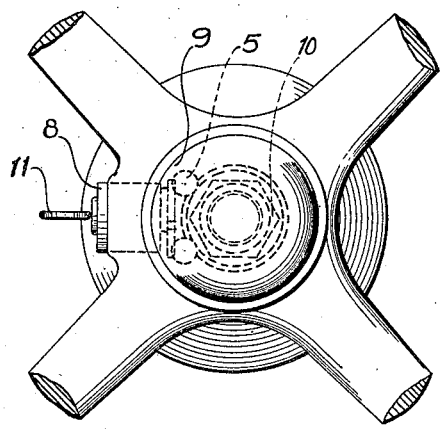
Figure 4:
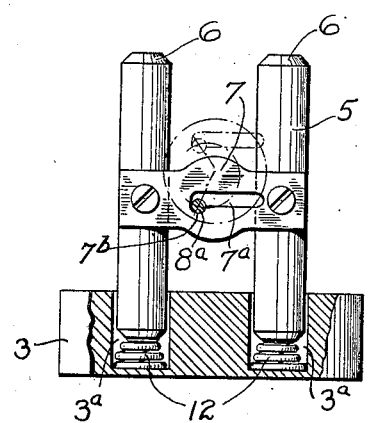

The above objects and the important features of the invention are hereinafter clearly set forth, and the elements co-operating to produce a structure embodying the invention are illustrated in the appended drawing, of which:

Fig. 1 illustrates part of a steering wheel mounted on a steering post, and some parts are shown in section for the sake of clearness, Fig. 2 is a sectional view of the wheel hub, Fig. 3 is a plan view substantially in agreement with Fig. 1, and Fig. 4 illustrates, on a larger scale, the bolt mechanism of the structure.

The numeral 1 denotes the steering wheel and 2 is the steering post. On the latter is removably fitted a collar 3, which must be strongly secured to the post in order not to be twisted loose in operation, but as the means of clamping the said collar on the post forms no part of the invention, I have merely indicated this feature by seating a set screw 4 in the collar and post. The wheel-hub is bored to receive the post, and it is concentrically recessed to receive and cover the said collar. Parallel with, and opening into the said bore are two smaller bores, in which are seated the pins 6 of a bolt-element 5. The said pins are rigidly combined by a bridge 7, and the latter is made with a transverse slot $7^a$ wide enough to receive the driving pin $8^a$ of a tumbler lock 8.

The top of the wheel-hub is reduced in diameter, and it is threaded to receive a screw-cap 9, which is provided with recesses $9^a$ aligned to receive the said bolt-pins 6. The top of the steering post is also reduced in diameter and threaded to receive a nut 10, which locks the wheel against longitudinal movement on the post. As the driving pin $8^a$ is turned, by means of the key 11, it operates to slide the bolt-pins 6 in and out of engagement with the screw-cap 9 and with recesses $3^a$ of the collar 3, and it is noted that the said pins are clear of the collar when engaging the screw-cap. Conversely they are also clear of the screw-cap when in engagement with the collar.

In the first place the collar is firmly clamped in position on the post, and the bolt 5 is inserted into the wheel-hub. The wheel is then placed on the post and the lock-nut 10 screwed into position. Next the wheel is revolved on the post until the bolt-pins 6 register with the collar sockets $3^a$, whereupon the key 11 can be turned to seat the said pins in the collar. Finally the screw-cap 9 is screwed on tight, and the structure is complete with the wheel and post rigidly combined for simultaneous rotation. In this position the parts can again be separated and re-assembled, but when the key is turned back so as to seat the bolt-pins in the screw-cap, the wheel becomes disengaged from the post so far as rotation is concerned, while at the same time the wheel and screw-cap become interlocked. It is then impossible to dis-assemble the parts without breaking or cutting open either the hub or screw-cap, and with modern methods of manufacture and heat-treatment the parts may readily be made substantial enough to resist the attempts of a trespasser to gain unnoticed access to the steering post.

It was stated above that the slot 7ª of the bolt bridge 7 is cut one-sided. The consequence is that the key 11 may be inserted and the lock-tumbler given substantially a half-turn, whereupon they come to a positive stop at the time the bolt-pins fully engage the collar 3, and there the key must of necessity remain, seated in the lock, until it is turned back to disengage the wheel from the post, whereupon the key may be pulled out of the lock. In other words the key remains in the lock while the vehicle is in operation, and as such key invariably is carried on a keyring, with other keys, the driver is not apt to forget releasing the wheel, because he sees the keys dangling in front of him; and he will want to keep his keys in his pocket when he leaves the vehicle. Tumbler locks are so universally used at the present time that everyone knows, or can determine for himself, that the key cannot be extracted while the tumbler is displaced. For this reason, and also because I do not wish to claim a specific tumbler lock construction in this combination, such well known standard construction has not been illustrated in the drawing. In order that the weight of the bolt structure 5 may not in any way influence the mechanism it is advantageous to provide counter-balancing elements, and these elements may take the shape of a pair of coil springs 12. There is a remote chance, however, that the said springs, aided by the vibrations of the vehicle, will operate to rotate the tumbler in the lock 8 sufficiently to disengage the wheel from the post, in which case the driver would be in danger of losing control of the vehicle. It is noted, however, that the slot 7ª is made long enough to permit the lock-pin 8ª to pass the dead center, whereupon the pressure of the said springs 12 operates to maintain the bolt 5 yieldingly in position, as best shown in Figs. 2 and 4. A shallow notch 7ᵇ, cut into the end of the slot 7ª, substantially as indicated, and into which the said lock-pin will be drawn by the pressure of the said springs, will even further operate to maintain the said bolt in position.

I claim:

1. In a steering wheel lock, in combination with the post and wheel, a pair of bolts longitudinally slidable in the wheel hub, a cap covering the top of said post and wheel and having internal sockets for the upper end of said bolts, a collar rigid on said post and provided with internal sockets for the lower end of the bolts, a cross bar combining said bolts, said bar having a transverse slot, and a key operated lock having a driving pin engaging said slot.

2. The combination with the steering post, a wheel rotatable on said post, and a cap on said wheel covering the top of the post; of a pair of reciprocatory bolts aligned with sockets in said cap and with sockets in a collar of said post, a cross bar combining said bolts and having a transverse slot, a key operated tumbler lock in the hub of said wheel and having a driving pin seated in said slot for operating said bolts as described, said slot being displaced relative to the center of the tumbler lock so as to limit the circular movement of said pin to slightly more than a half circle, a depression at the end of the slot for the said pin to lodge in at the end of its stroke, and resilient devices for yieldingly maintaining the pin in said limited position.

In testimony whereof I have hereunto affixed my signature.

JAMES D. KING.